United States Patent [19]

Tateishi

[11] Patent Number: 5,656,895

[45] Date of Patent: Aug. 12, 1997

[54] DISPLAY APPARATUS

[75] Inventor: Kozo Tateishi, Ibaraki, Japan

[73] Assignee: Matsushita Electric Industrial Co., Ltd., Osaka-Fu, Japan

[21] Appl. No.: 541,023

[22] Filed: Oct. 11, 1995

Related U.S. Application Data

[63] Continuation-in-part of Ser. No. 65,429, May 24, 1993, abandoned, which is a continuation of Ser. No. 904,639, Jun. 26, 1992, abandoned.

[30] Foreign Application Priority Data

Jun. 26, 1991 [JP] Japan ................. 3-154437
Dec. 19, 1991 [JP] Japan ................. 3-336537

[51] Int. Cl.$^6$ ............... G09G 1/04; H01J 29/58
[52] U.S. Cl. ............................................ 315/382
[58] Field of Search ............................. 315/382, 382.1

[56] References Cited

U.S. PATENT DOCUMENTS 4,319,163  3/1982  Chen ............................ 315/14
4,558,253  12/1985  Bechis et al. ............... 313/414
4,587,464  5/1986  Ho et al. .................... 315/382
4,916,365  4/1990  Arai ............................ 315/383

FOREIGN PATENT DOCUMENTS

57-84683  5/1982  Japan.

Primary Examiner—Gregory C. Issing
Attorney, Agent, or Firm—Wenderoth, Lind & Ponack

[57] ABSTRACT

In a display apparatus, the focus shift and astigmatism of the electron beams in the CRT and its vicinity portion are reduced. Picture scenes of higher fidelity and higher acuteness and higher resolution are obtained. In an electron beam focusing controller circuit contained therein, signals corresponding to a high-pass component and a luminance component in the image signals from a horizontal direction electron beam focusing determination circuit, and signals corresponding to a low-pass component in the image signals from a vertical direction electron beam focusing determination circuit are combined. The combined signals are processed by a driving voltage generator and supplied to an auxiliary acceleration focusing electrode of a CRT.

3 Claims, 10 Drawing Sheets

- $a_1$ — input to 11 (vertical synchronizing signal)
- $a_2$ — reverse signal of $a_1$
- $a_3$ — output from 11
- $a_4$ — output from 12

Fig.5(b)

- $b_1$ — input to 13 (horizontal synchronizing signal)
- $b_2$ — input to 14 (reverse signal of $b_1$)
- $b_3$ — output from 14
- $b_4$ — output from 15

Fig.5(c)

output from 16
(output from 19)

Fig.5(d)

output from 29
(longitudinal)

Fig.5(e)

output from 49

Fig.5(f)

input to 10
(input video signal)

Fig.5(g)

reverse signal of f
after removing
synchronizing signal

Fig.5(h)  output from 39
(long sideways)

vertical synchronizing signal
input to 11
output from 11
output from 12

Fig.6(b)

horizontal synchronizing signal
reverse signal to $b_1$
output from 14
output from 15

Fig.6(c)

output from 16, 60

Fig.6(d)

correction of horizontal outline
output from 61

Fig.6(e)

output from 63

DISPLAY APPARATUS

This appplication is a Continuation-In-Part of now abandoned application Ser. No. 08/065,429, filed May 24, 1993, which in turn in a continuation of now abandoned application Ser. No. 07/904,639, filed Jun. 26, 1992.

BACKGROUND OF THE INVENTION

The present invention generally relates to a display apparatus for image reproduction, character display or the like using a cathode-ray tube (hereinafter referred to as a CRT).

An inline self-convergence CRT system (hereinafter referred to as a non-uniformmagnetic system) in a television field causes considerable resolution deterioration when electronic beams are deflected by deflection yokes. The deterioration in picture scenes and their circumferences is significant. Various proposals have been introduced to solve the problem. A dynamic focusing system is available to remove the difference in focusing, for example, between the central portion of the picture scene and the circumference portion. In order to remove the deflection distortion in the circumference, an electromagnetic correcting system is disclosed in Japanese Laid-Open Patent publication No. 57-84683, and an electrostatic system is represented by a DAF system.

Exceptional resolution deterioration is caused in the deflection of the electron beams in a wide range even if the yoke is a uniform magnetic field deflection yoke.

The above described Japanese Laid-Open Patent publication No. 57-84683 is complicated in construction, composition, and has a high cost. The electrostatic system represented by the DAF system is high in applied voltage, with problems in terms of reliability and cost.

SUMMARY OF THE INVENTION

Accordingly, the present invention has been developed with a view to substantially eliminate the above discussed drawbacks inherent in the prior art and has for its essential object to provide an improved display apparatus.

Another object of the present invention is to provide an improved apparatus where the resolution deterioration in the picture scene is corrected by a prefocus lens portion of an electron gun to obtain optimum images, with electronic beam shape being modulated by parabolic waveforms of horizontal and vertical periods of parabolic waveforms and frequency components of the image signals (hereinafter referred to as a dynamic prefocus system).

Still another object of the present invention is to provide an improved display apparatus where a moire phenomenon caused by the interaction between the electronic beam spot and a shadow mask is removed so as to reduce a light emission saturation phenomenon of phosphor caused by the concentration of electronic beam spots.

As disclosed in Japanese Patent publication No. 61-6970, a cathode ray tube having an electron gun is used so that auxiliary acceleration and focusing electrodes are provided on the cathode side of the accelerating electrode or on the main lens side. Rectangular or similar shaped electronic transmission apertures are formed in each of a control electrode, an accelerating electrode and an auxiliary accelerating electrode. The above described control electrode is arranged so that the major axis direction of the electronic transmission aperture is parallel with respect to the main scanning direction of the electronic beam. The electronic transmission aperture of either the above described accelerating electrode or the auxiliary acceleration focusing electrode are arranged so that the major axis direction thereof is orthogonal to the major axis direction of the electronic transmission aperture of the above described control electrode. The electronic transmission aperture of the other electrode is arranged so that the major axis direction is parallel to the major axis direction of the electronic transmission aperture of the above describe control electrode. Alternatively, the cathode ray tube having an electron gun is used so that an auxiliary acceleration and focusing electrode is arranged on the cathode side of the accelerating electrode or the main control electrode. A round or rectangular electronic transmission aperture is formed in each of the control electrode, accelerating electrode and auxiliary accelerating electrode. The dynamic voltage is applied to the auxiliary acceleration and focusing electrode so as to reduce the deterioration of the resolution, wherein the voltages for correcting the focusing shift and astigmatism distortion in the picture scene vicinity are added together.

Figure 7:
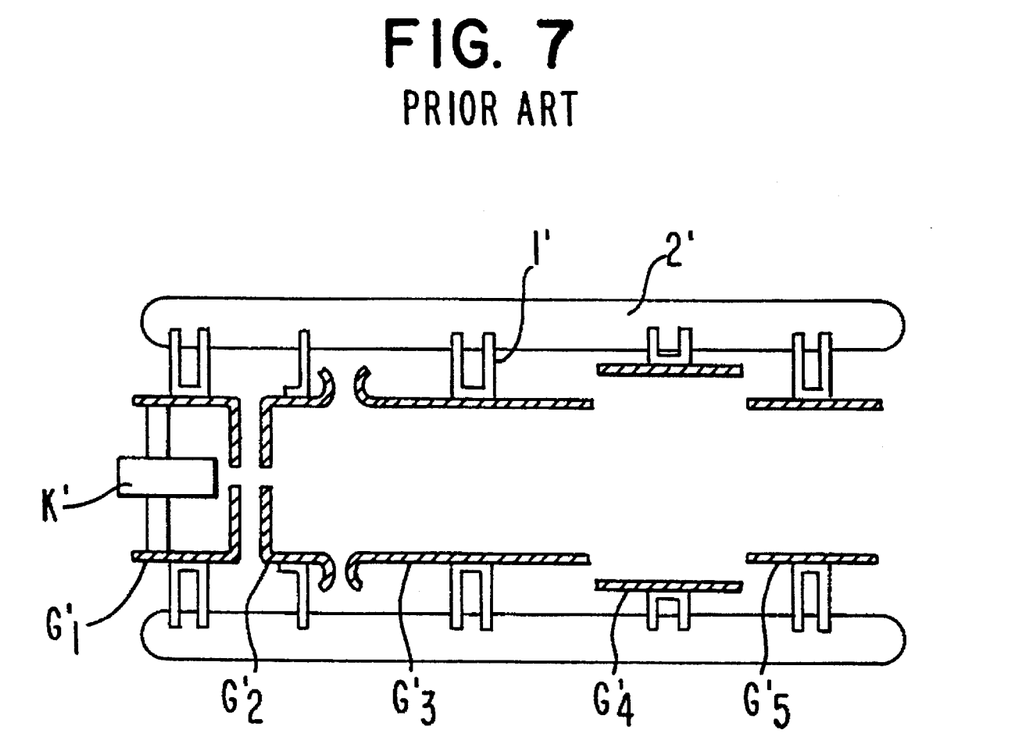
FIGS. 7 and 8A–8C illustrate views of a conventional electron gun.
Figures 8A, 8B:
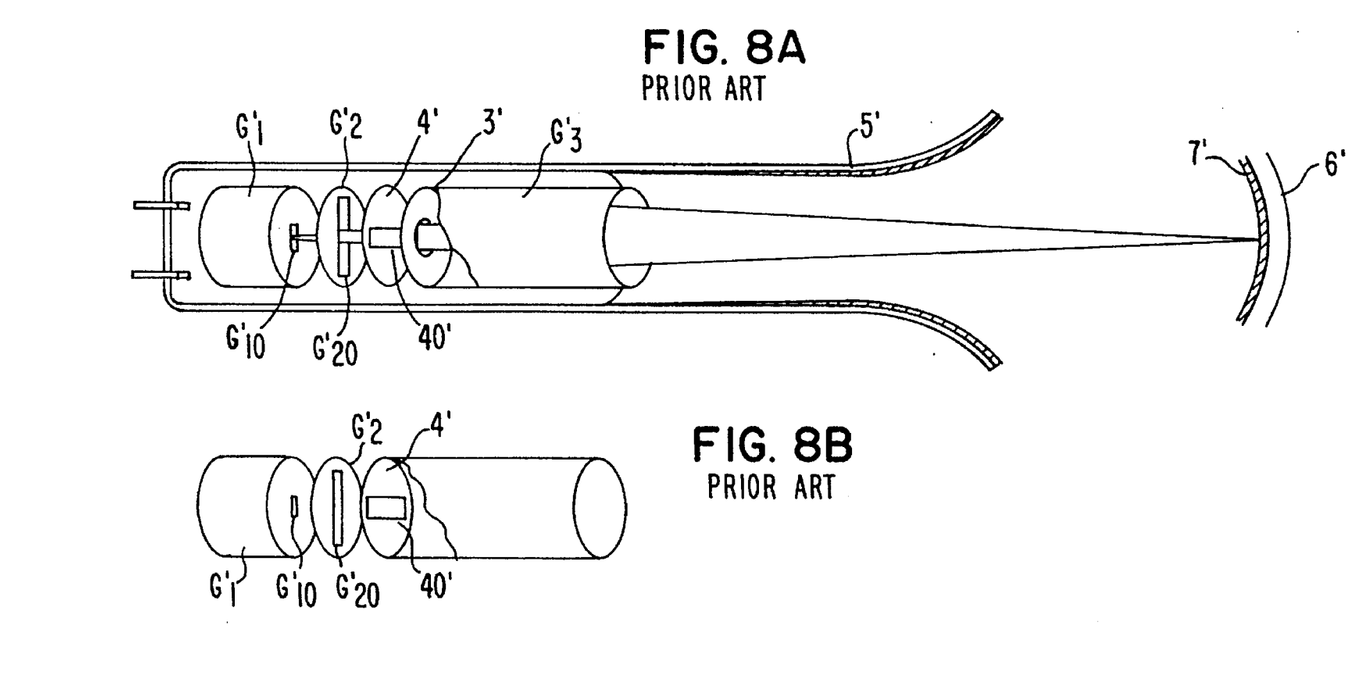
Figure 8C:
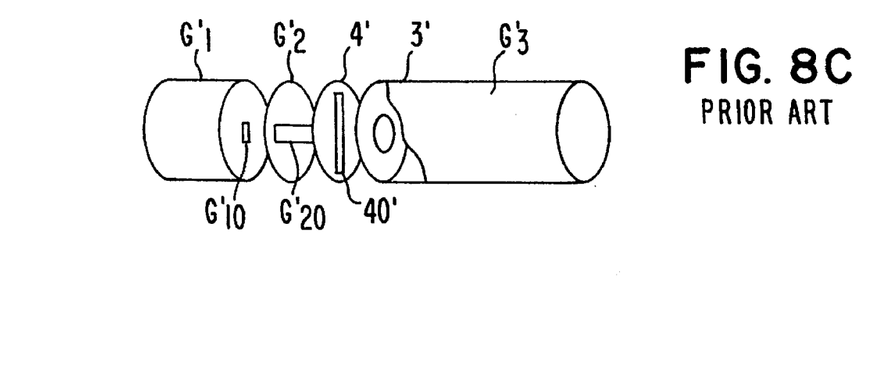

FIG. 7 is a sectional view of a conventional electron gun and FIGS. 8A, 8B and 8C show examples of an electron gun shown in Japanese Publication Serial No. JP 61-6970.

In general, a conventional electron gun comprises first, second, third, fourth and fifth grids $G1'$, $G2'$, $G3'$, $G4'$, and $G5'$ and a cathode $K'$ as shown in FIG. 7. The amplitude of the electron beams generated by the cathode $K'$ is controlled by the first grid $G1'$ serving as an electron control electrode, and thereafter taken out by the second grid $G2'$. The generated electron beams are further accelerated by the third and fifth grids $G3'$ and $G5'$, where $G3'$ serves as a pre-focusing electrode while $G5'$ serves as an acceleration irradiation electrode for accelerating and irradiating electron beams to a target. In the meantime, the electron beams are focused by means of the fourth grid $G4'$ which serves as a focusing electrode for focusing the electron beams on the target.

In FIG. 7, a cathode lens is comprised of the first and second grids, while a pre-focusing lens is comprises of the second and third grids. The main lens is comprised of the third, fourth and fifth grids.

FIGS. 8A–8C show the construction of an electron gun of high-potential type, in which in FIG. 8A, reference numeral $3'$ is the neck of the tube; and $G1'$, $G2'$, $G3'$ are the first, second and third grid electrodes respectively. Element $4'$ is an auxiliary focusing electrode inserted between the second and third grid electrodes. Element $5'$ is a conductive layer provided along the inner wall of the neck of the tube $3'$ to be formed by painting with carbon and the like, and the main lens is formed between the third grid and the conductive layer $5'$. As one example of the voltage applied to each of the grid electrodes of the electron gun, −50 volts is applied onto the first grid electrode, 300 volts to the second grid electrode, 1000 volts to the auxiliary acceleration focusing electrode, 8000 volts to the third electrode, and 25 kilovolts to the conductive layer $5'$.

By this arrangement, the auxiliary acceleration focusing electrode is provided in the electron gun, where the voltage to be applied to the auxiliary acceleration focusing electrode is a fixed voltage. In addition, the parabolic wave voltage is applied to the main focus lens electrodes $G4'$ and $G5'$.

The present invention corrects the focus shift of the electron beam spot of the picture scene and reduces the astigmatism caused by the above described construction. The present invention controls the shape of the electron beam spot in accordance with the frequency component of the image signal across the entire picture scene, so that the bright point shape on the fluorescent screen can be selectively determined. An electron beam bright point of high current density is obtained and the light emitting saturation of the phosphor can be removed.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 5(a) to 5(j) show signal waveforms of the circuit illustrated in FIG. 3;

FIGS. 6(a) to 6(j) show signal waveforms of the circuit illustrated in FIG. 4;

DETAILED DESCRIPTION OF THE INVENTION

Before the description of the present invention proceeds, it is to be noted that like parts are designated by like reference numerals throughout the accompanying drawings.

An embodiment of the present invention will be described hereinafter with reference to the drawings.

Figure 1:
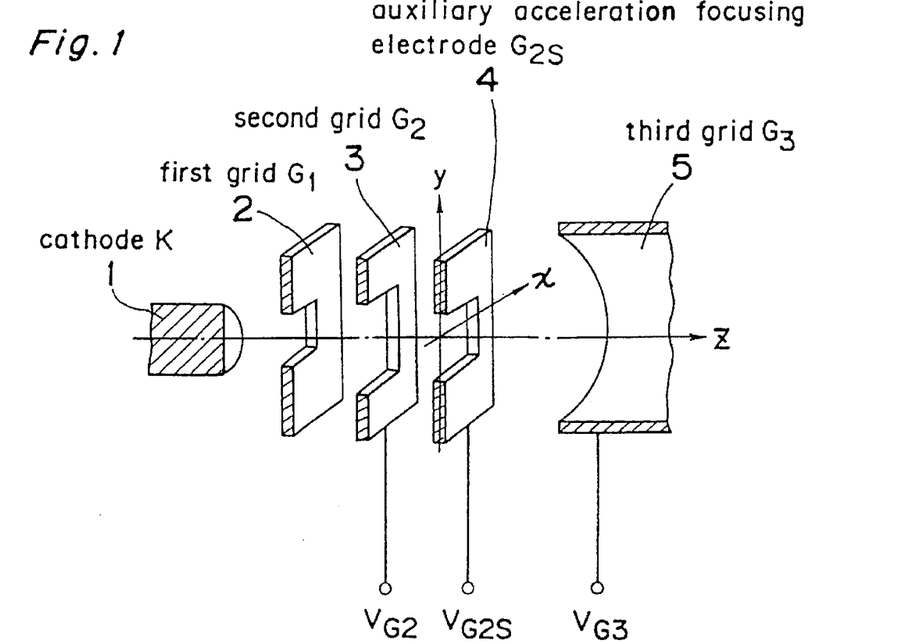
FIG. 1 is a perspective view showing an electron gun electrode construction of a CRT in accordance with a first embodiment of the present invention.

FIG. 1 shows the electrode construction of a CRT. There are two second electrodes. They both have rectangular shaped electron beam transmission apertures. The major axes of the respective rectangles are orthogonal. It is characteristic that the spot shape of the electron beam can be controlled by the voltage applied to the electrode (see Japanese Patent Publication No. 61-6970).

First, a dynamic astigmatism (or focus) correction voltage generator 19 shown in FIG. 3 will be described. Image signals input to the terminal 10 are fed to a vertical sawtooth waveform generator circuit 11 and a vertical parabolic waveform generator circuit 12 so as to form vertical parabolic waveforms. The same image signals are fed to a horizontal pulse waveform generator circuit 13, a phase shift controller circuit 14, a horizontal parabolic waveform generator circuit 15 so as to obtain horizontal parabolic waves. The vertical parabolic waveforms of the circuit 13 and the horizontal parabolic waveforms of the circuit 15 are added by a first adding circuit 16, and are inputted into a $V_{G2S}$ driving voltage generator 59.

A horizontal direction electron beam focusing determination circuit 29 is composed of a high-pass component detector circuit 21, a luminance signal component detector circuit 22 and a second adding circuit 23. An image signal input to the terminal 10 is fed to the high-pass component detector circuit 21 and image signals equivalent to the outline are outputted. The same inputted image signal is fed to the luminance signal component detector circuit 22 and image signals equivalent to the luminance are outputted. Both of the above described outputs are added by the second adding circuit 23 and are inputted to an electron beam focusing controller circuit 49. The signal determines the spot size in the horizontal direction and at the same time, has a level adjusting function.

A vertical direction electron beam focusing determination circuit 39 is composed of a delay line 31 for delaying the image signal by 1H and a subtracter circuit 32. A signal equal to the difference between the original signal and the signal delayed by 1H is generated by the subtracter circuit 32, and is inputted to the electron beam focusing controller circuit 49. The signal determines the spot size in the vertical direction and at the same time, has a level adjusting function.

In the electron beam focusing controller circuit 49, signals from the horizontal direction electron beam focusing determination circuit 29 and signals from the vertical direction electron beam focusing determination circuit 39 are inputted. They are converted into signals for controlling the electron beam focusing so as to input the output signal into a third adding circuit 51.

A $V_{G2S}$ driving voltage generator 59 is composed of the third adding circuit 51 and a $V_{V2S}$ voltage generator circuit 52. A voltage $V_{G2S}$ controlled by the third adding circuit 51 is applied to an auxiliary acceleration focusing electrode $G_{2S}$ (element 4 of FIG. 1).

FIGS. 5(a) to 5(j), show signal waveforms of the above described operations.

By the use of the above described prefocus driving circuit, the deflection distortion and the geometric distortion of the electron beam due to the non-uniform magnetic deflection are improved. Furthermore, the vertical direction and horizontal direction frequency components of the image signals are detected. The electron beam form is controlled (the formation of the vertical length beam spot and the horizontal length beam spot are freely effected so that the brightness point shape on the fluorescent screen can be selectively determined) so that a display apparatus of higher acuteness and higher resolution can be obtained.

A second embodiment of the present invention will be described hereinafter with reference to the drawings.

Figure 2:
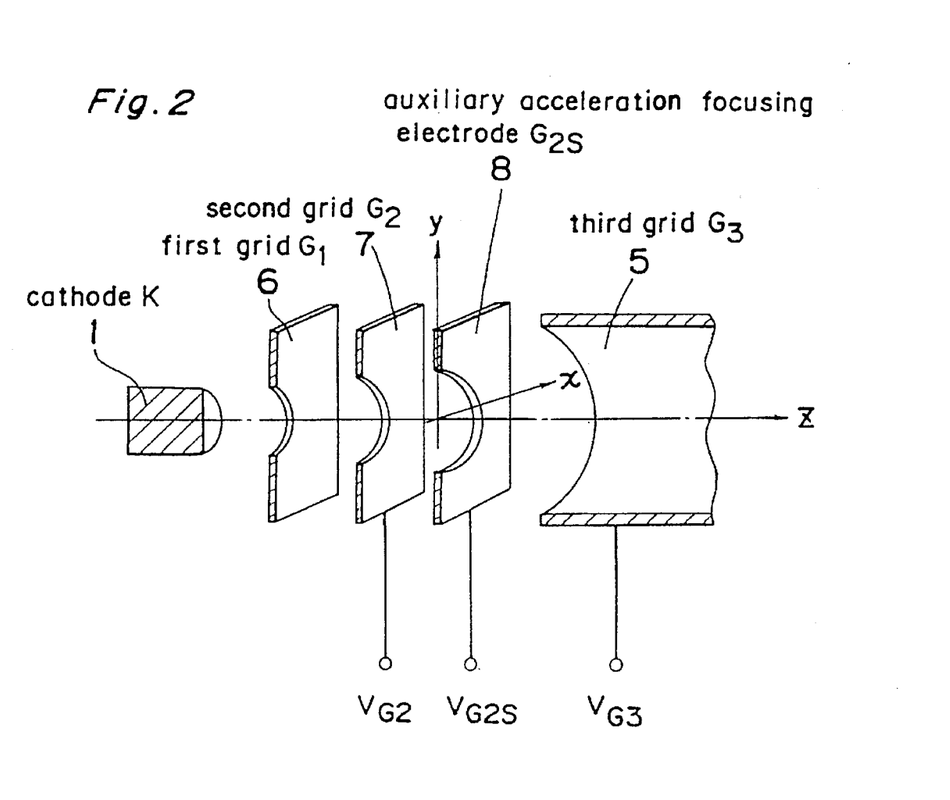
FIG. 2 is a perspective view showing an electron gun electrode construction of a CRT in accordance with a second embodiment of the present invention.
Figure 4:
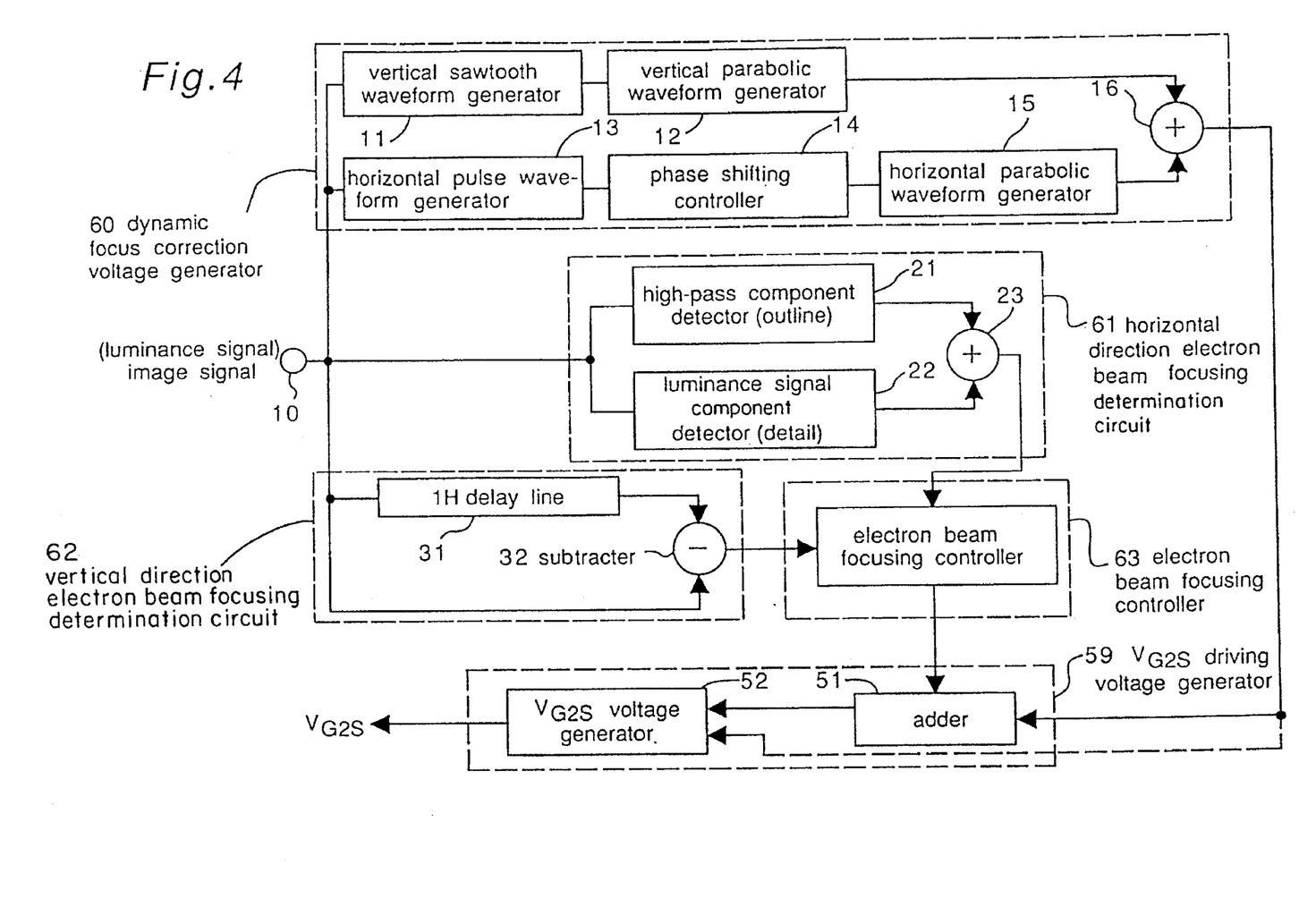
FIG. 4 is a dynamic prefocus driving circuit block diagram in accordance with the second embodiment of the present invention.
Figure 5A:
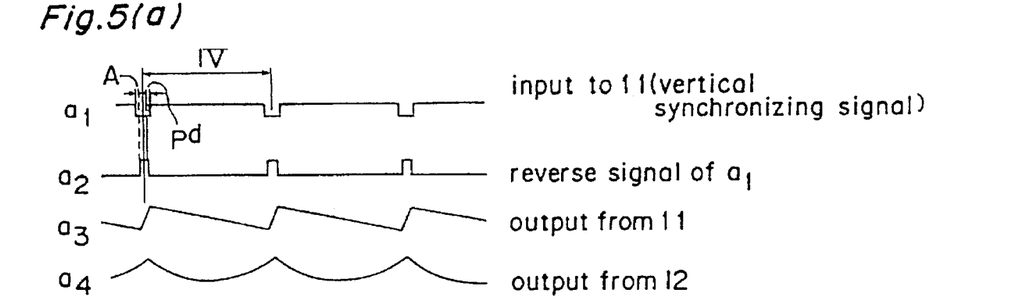
Figure 5B:
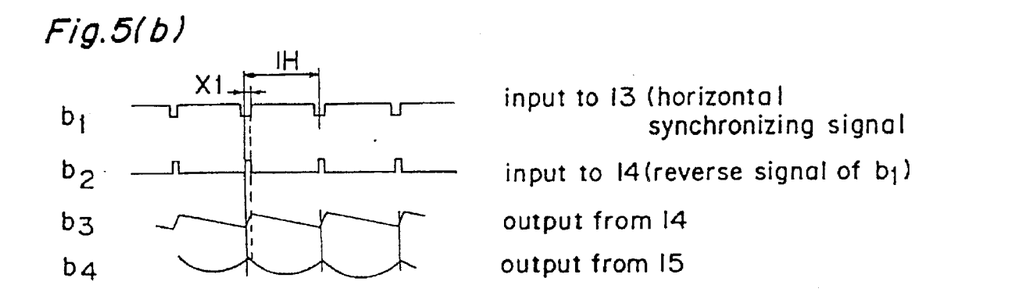
Figure 5C:
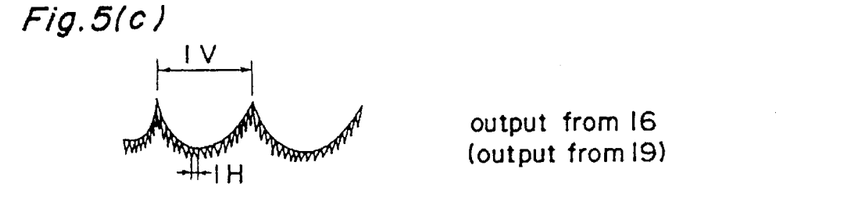
Figure 5D:
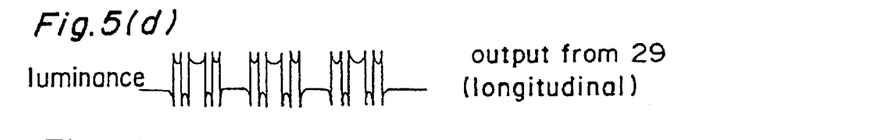
Figure 5E:
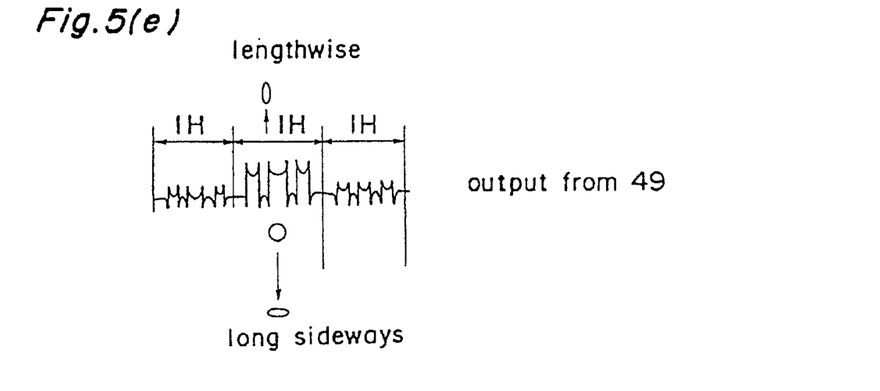
Figure 5F:
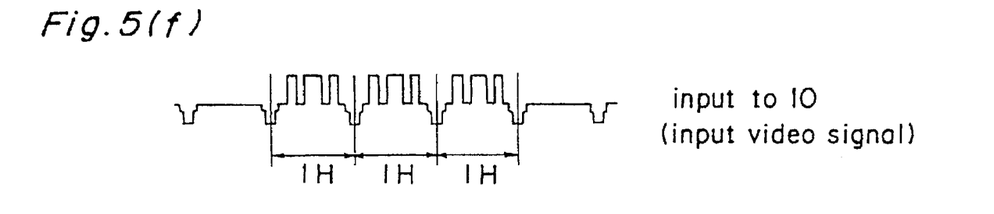
Figure 5G:
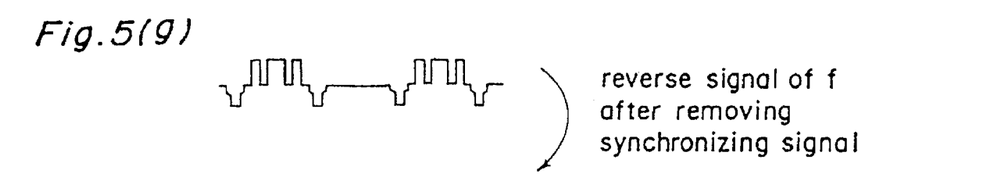
Figure 5H:
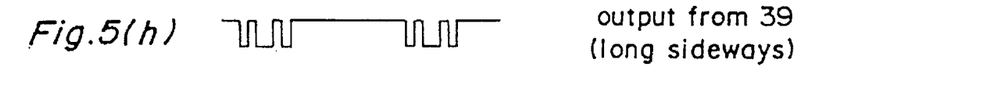
Figure 5I:
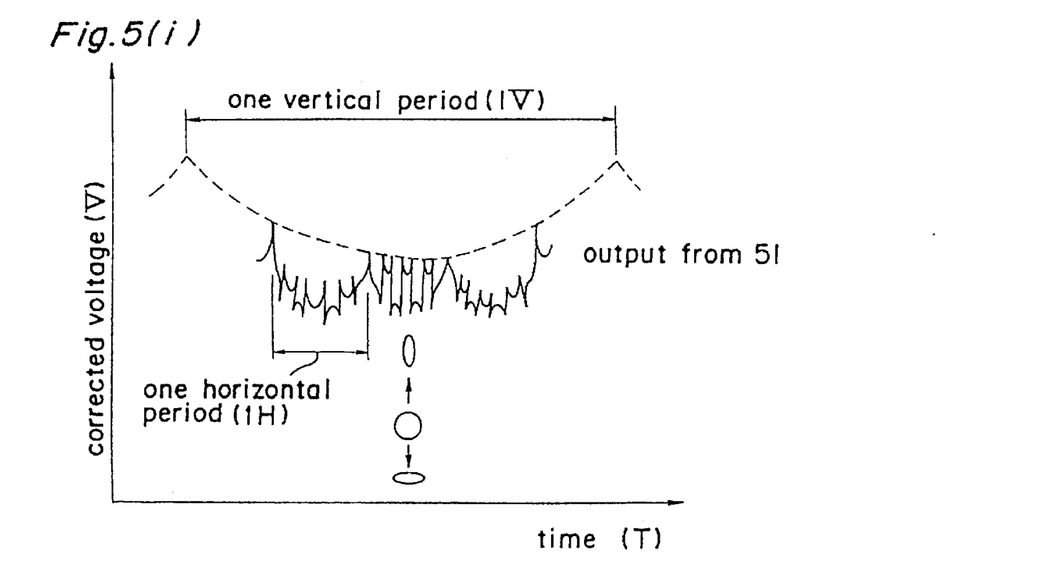
Figure 5J:
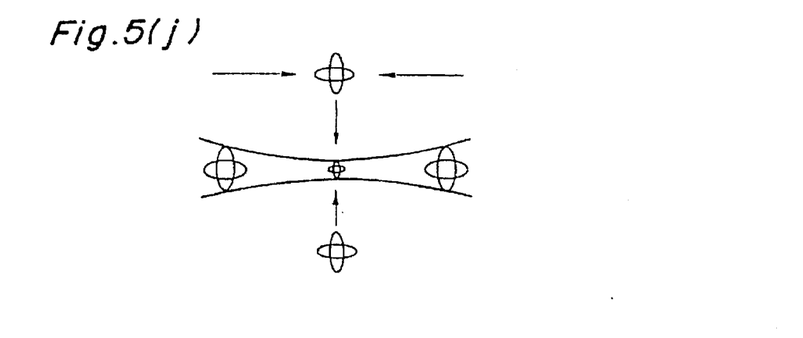
Figure 6A:
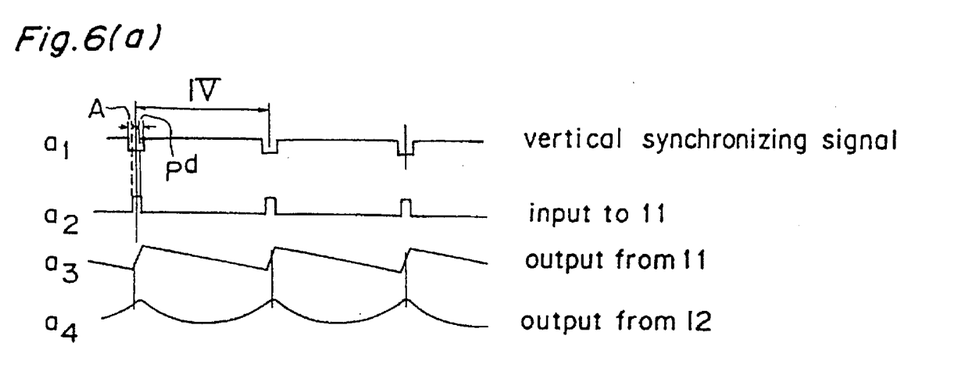
Figure 6B:
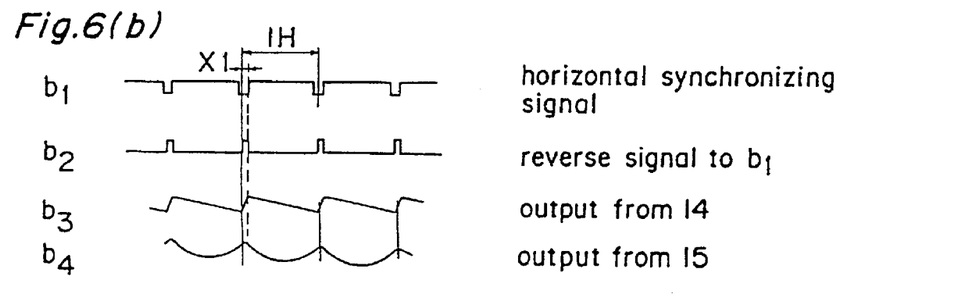
Figure 6C:
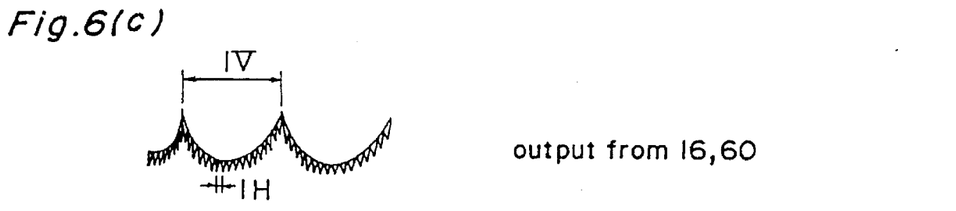
Figure 6D:
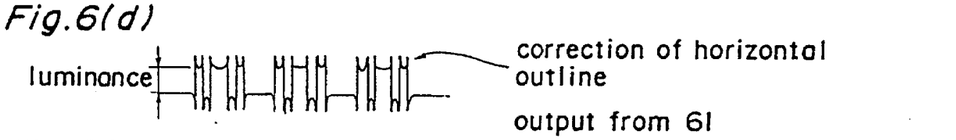
Figure 6E:
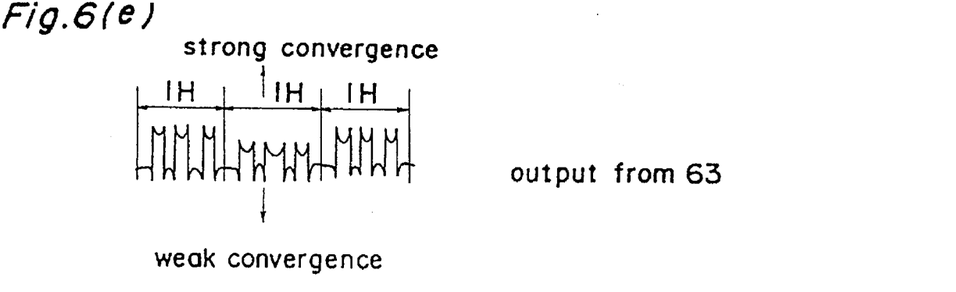
Figure 6F:
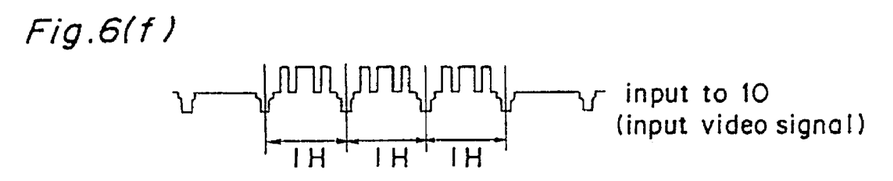
Figure 6G:
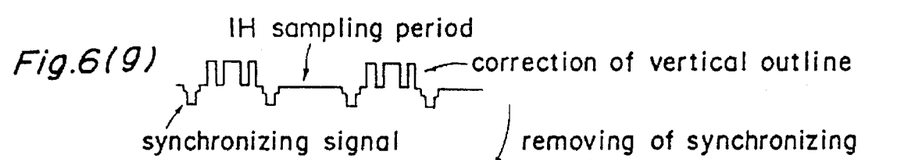
Figure 6H:
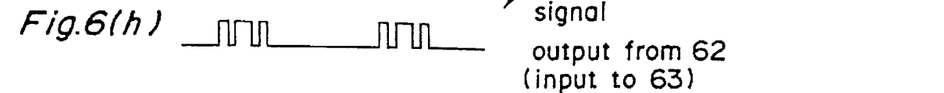
Figure 6I:
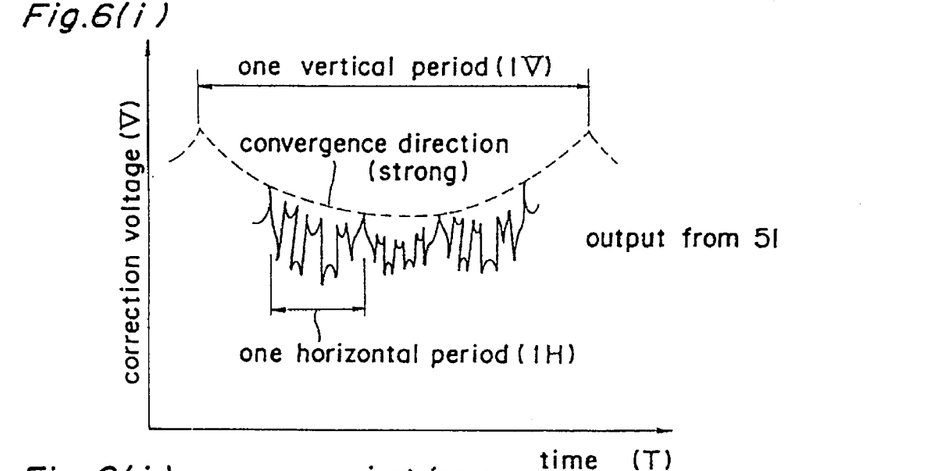
Figure 6J:
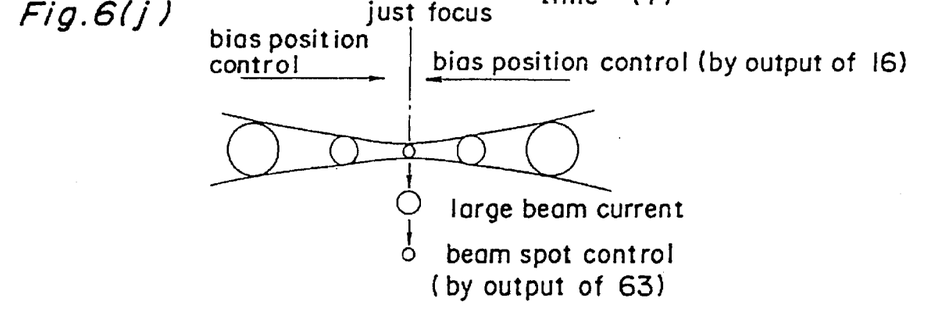

The electrode construction of another CRT in FIG. 2. There are two second electrodes. They both have round shaped electronic beam transmission apertures. It is characterized that the focusing of the electron beam spot can be controlled by the voltage applied to the electrode. The dynamic astigmatism (or focus) correction voltage generator 60 is shown in FIG. 4. The image signals input to the terminal 10 are fed to a vertical sawtooth waveform generator circuit 11 and a vertical parabolic waveform generator circuit 12 so as to form vertical parabolic waveforms. The same image signals are fed to the horizontal pulse waveform generator circuit 13, a phase-shifting control circuit 14, and a horizontal parabolic waveform generator circuit 15 so as to obtain the horizontal parabolic waveforms. The vertical parabolic waveforms of the outputs of the vertical parabolic waveform generator circuit 12 and the horizontal parabolic waveforms of the output of the horizontal parabolic waveform generator circuit 15 are added by the first adding circuit 16, and are inputted to the $V_{G2S}$ driving voltage generator 59.

A horizontal direction electron beam focusing determination circuit 61 is composed of a high-pass component detector circuit 21, a luminance signal component detector circuit 22, and a second adding circuit 23. The image signals input to the terminal 10 are fed to the high-pass component detector circuit 21, and image signals equivalent to the outlines are outputted. The same image signals are fed to the luminance signal component detector circuit 22, and image signals equivalent to the luminance are outputted. Both the above described outputs are added by a second adding circuit 23 and are inputted to an electron beam focusing controller circuit 63. The signal determines the spot size, and at the same time, has a level adjusting function.

A vertical direction electron beam focusing determination circuit 62 is composed of a delay line 31 for delaying by 1H the image signals and a subtracter circuit 32. Signals equal to the difference between the original signals and the 1H delayed signals are generated by the subtracting circuit 32 and are inputted to the electronic beam focusing controller circuit 63. The signal determines the spot size and at the same time, has a level adjusting function.

In the electron beam focusing controller circuit 63, signals from the horizontal direction electron beam focusing determination circuit 61 and the signals from the vertical direction electron beam focusing determination circuit 62 are inputted. They are converted into the electron beam focusing signals and are inputted to a third adder circuit 51.

A $V_{G2S}$ driving voltage generator 59 is composed of the third adding circuit 51 and a $V_{G2S}$ voltage generator circuit 52 and applies a voltage $V_{G2S}$ to an auxiliary acceleration focusing electrode $G_{2S}$ (element 8 of FIG. 2).

By the use of the above described dynamic prefocus driving circuit, the difference in focus between the central portion of the picture screen and areas in its vicinity is removed. Further, the vertical direction and horizontal direction frequency component of the image signal is detected so as to control the focusing of the electron beam, so that a display apparatus of higher acuteness and higher resolution may be obtained. FIGS. 6(a) to 6(j) show signal waveforms of the above described operations.

As clear from the above described embodiment, the present invention improves the focus shift of the electron beams across the picture screen of the CRT, and further controls the focus of the electron beams in accordance with the component of the image signal across the entire picture screen, so that a display apparatus of higher fidelity and higher acuteness and higher resolution can be obtained.

Figure 3:
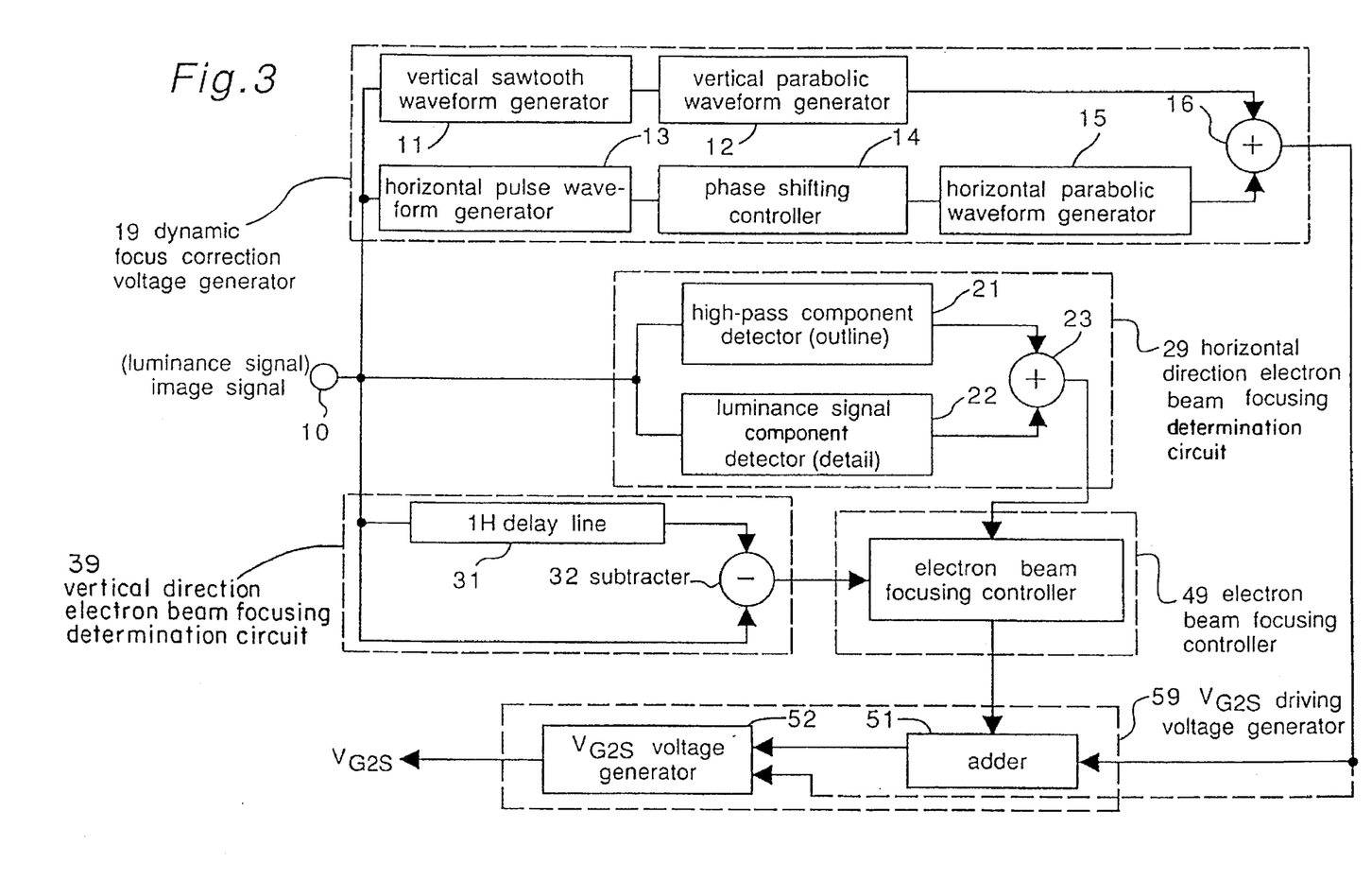
FIG. 3 is a spot shaped control dynamic prefocus driving circuit block diagram of an electron beam in accordance with the first embodiment of the present invention.
Figure 9:
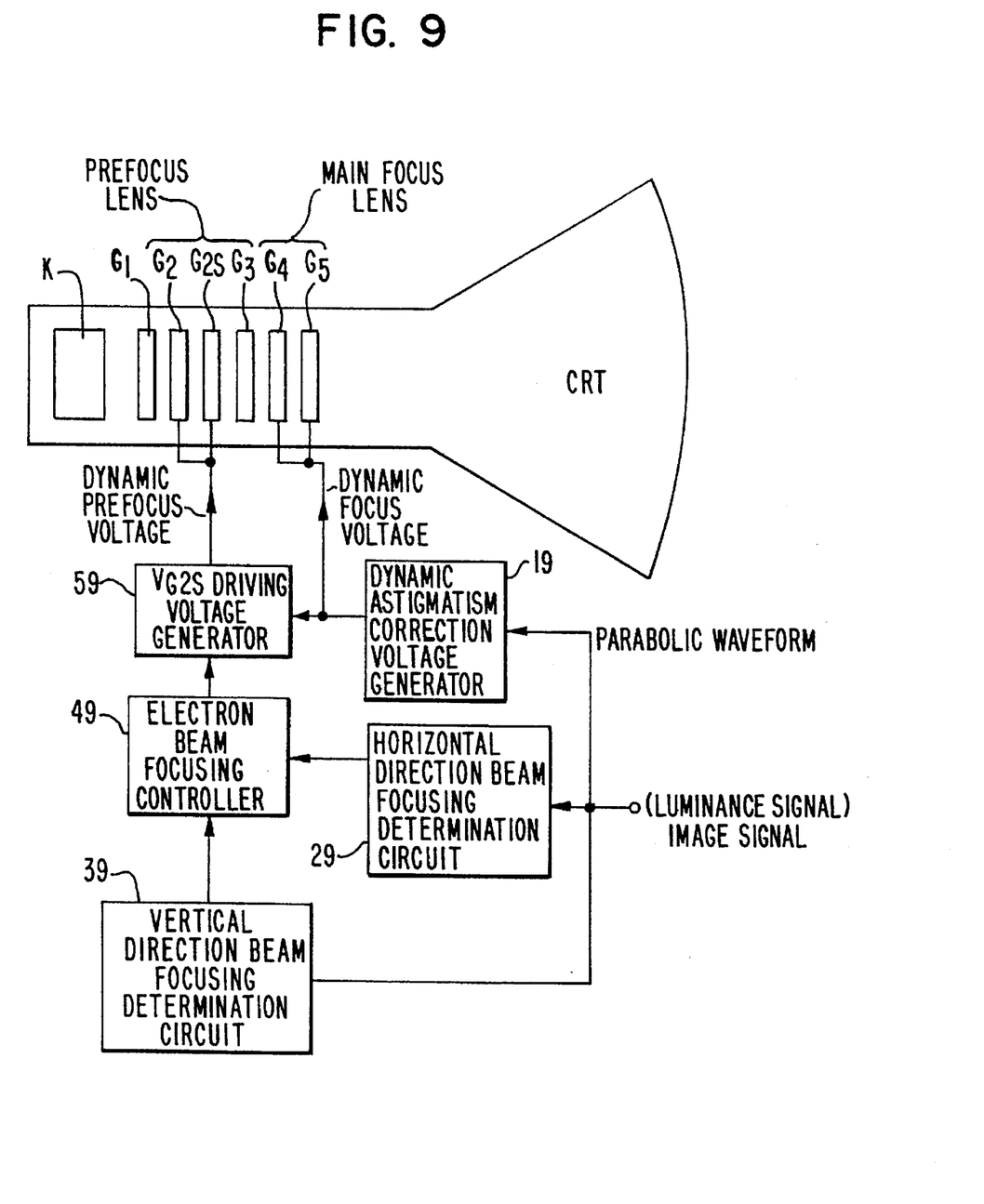
FIG. 9 illustrates an entire display apparatus in accordance with the present invention.

FIG. 9 illustrates an entire display system in accordance with the present invention in which the elements of FIG. 3 are connected to a CRT.

The CRT includes a cathode K, and grids $G_1$, $G_2$, $G_{2S}$, $G_3$, $G_4$ and $G_5$.

Grids $G_2$, and $G_{2S}$ form a prefocus lens and receive a dynamic prefocus voltage from the $V_{G2S}$ driving voltage generator while grids $G_4$ and $G_5$ form a main focus lens and receive a dynamic focus voltage from the dynamic astigmatism correction voltage generator.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A display apparatus including a CRT, said apparatus comprising:

a dynamic focus correction voltage generator, said dynamic focus correction voltage generator generating a dynamic focus correction voltage signal consisting of vertical and horizontal cyclic parabolic waveforms and supplying said signal to at least one main focus grid of the CRT;

a horizontal direction electron beam focusing determination circuit, said horizontal direction electron beam focusing determination circuit generating a horizontal direction spot size signal in accordance with a high-pass component and luminance component contained within an image signal input thereto;

a vertical direction electron beam focusing determination circuit, said vertical direction electron beam focusing determination circuit generating a vertical direction spot size signal in accordance with a low-pass component contained within said image signal input thereto; and an electron beam focusing controller, said electron beam focusing controller receiving said horizontal direction spot size signal generated by said horizontal direction electron beam focusing determination circuit and said vertical direction spot size signal generated by said vertical direction electron beam focusing determination circuit and outputting a signal in response thereto; and a driving voltage generator, said driving voltage generator receiving said dynamic focus correction voltage signal and adding it to the output signal of said electron beam focusing controller and supplying a resultant added signal to at least one prefocus grid of the CRT.

2. A method of controlling a focus of a CRT included within a display apparatus, said method comprising the steps of:

generating a signal consisting of a vertical cyclic parabolic waveform and a horizontal cyclic parabolic waveform and using the generated signal to control a dynamic focus of the CRT by supplying the generated signal to a main focus lens of the CRT;

generating a horizontal direction spot size signal generated in accordance with a high-pass component and luminance component contained within an image signal and a vertical direction spot size signal generated in accordance with a low-pass component contained within the image signal;

combining the horizontal and vertical direction spot size signals to form a combined signal;

adding the generated signal to the combined signal to generate a signal which is applied to a prefocus lens of the CRT for controlling a dynamic prefocus of the CRT.

3. A display apparatus including a CRT, said apparatus comprising:

a first generator for generating a first generated signal based on vertical and horizontal cyclic parabolic waveforms, and applying said first generated signal to a main focus lens of the CRT for controlling a dynamic focus of the CRT;

a controller for generating a second generated signal based on a high-pass component and a luminance component contained within an image signal and a low-pass component contained within the image signal; and a voltage generator for adding said first and second generated signals, generating a dynamic prefocus voltage in response thereto, and applying said dynamic prefocus voltage to a prefocus lens of the CRT to control the prefocus of the CRT.

* * * * *